US006904209B2

United States Patent
Okada et al.

(10) Patent No.: US 6,904,209 B2
(45) Date of Patent: Jun. 7, 2005

(54) OPTICAL COMMUNICATION MODULE

(75) Inventors: Takeshi Okada, Osaka (JP); Hiromi Nakanishi, Osaka (JP); Yoshiki Kuhara, Osaka (JP); Akira Yamaguchi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 143 days.

(21) Appl. No.: 10/387,660

(22) Filed: Mar. 13, 2003

(65) Prior Publication Data
US 2003/0202750 A1 Oct. 30, 2003

(30) Foreign Application Priority Data
Apr. 26, 2002 (JP) ......................... 2002-125534

(51) Int. Cl.[7] .............. G02B 6/30; G02B 6/36
(52) U.S. Cl. ............ 385/49; 385/88; 385/89; 385/92; 385/94
(58) Field of Search ............. 385/49, 88–94, 385/14; 257/79

(56) References Cited

U.S. PATENT DOCUMENTS 6,264,377 B1 * 7/2001 Mitsuda et al. ............... 385/88
6,545,296 B1 * 4/2003 Mukaihara et al. ........... 257/79

FOREIGN PATENT DOCUMENTS

JP    11-068705    3/1999
JP    11-248978    9/1999

\* cited by examiner

*Primary Examiner*—Frank G. Font
*Assistant Examiner*—Michael P. Mooney
(74) *Attorney, Agent, or Firm*—Fish & Richardson P.C.

(57) ABSTRACT

An optical communication module having a roughened bottom of a silicon bench for suppressing optical crosstalk. The roughened bottom prevents stray laser beams from reflecting toward a photodiode. The roughened bottom is further covered with a photoabsorbent resin, pigment or adhesive for absorbing the stray laser beams at a bottom. A cladding of a lightwaveguide are narrowed and are painted with a photoabsorbent resin, pigment or adhesive for absorbing horizontally stray beams propagating in the cladding.

14 Claims, 6 Drawing Sheets

Embodiment 2

Fig.1 PRIOR ART
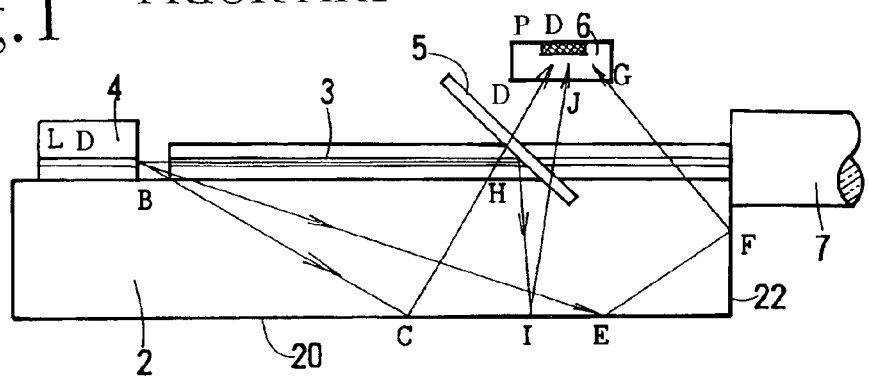
Fig.2 Embodiment 1
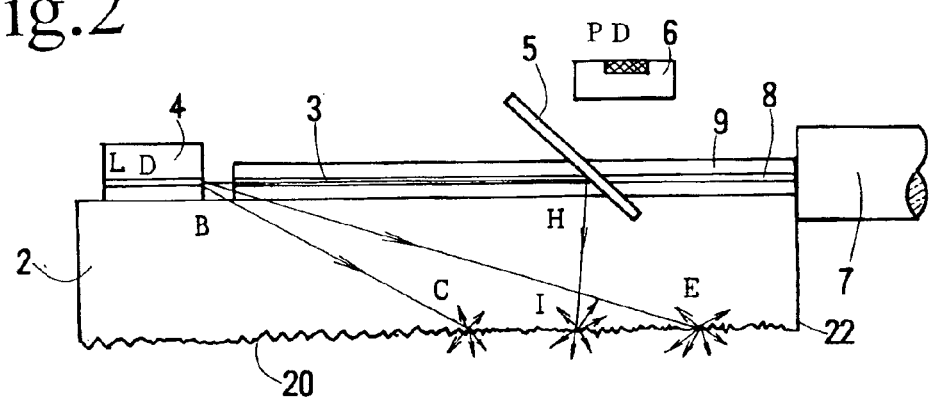
Fig.3 Embodiment 2
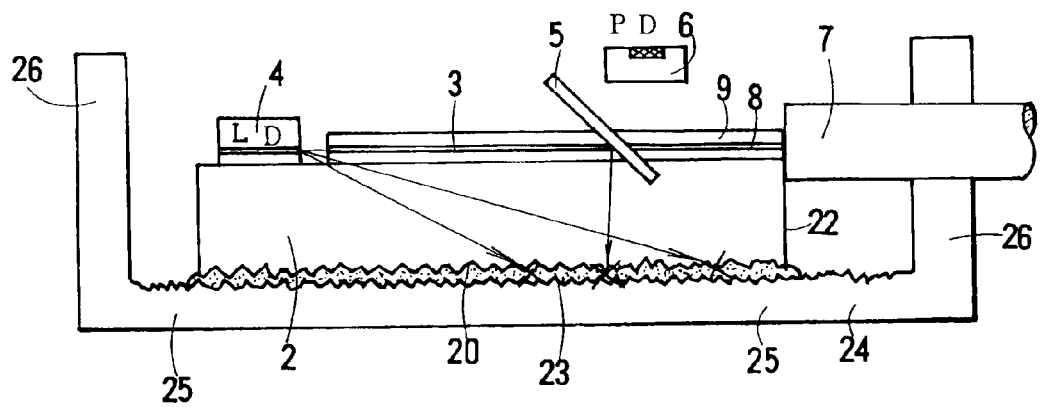

Fig.4 Embodiment 3
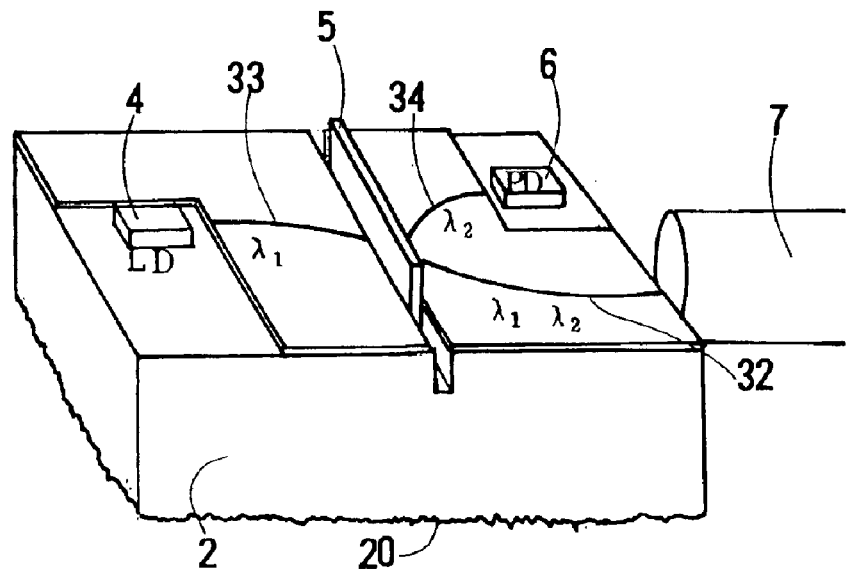
Fig.5 Embodiment 4
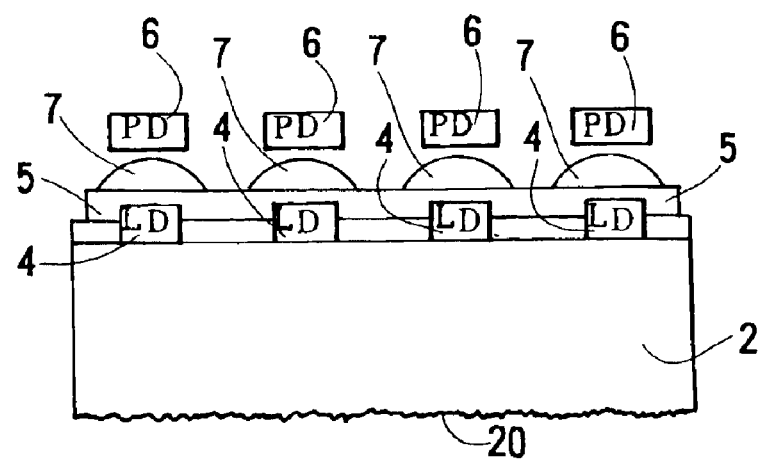

Fig.6
Embodiment 5
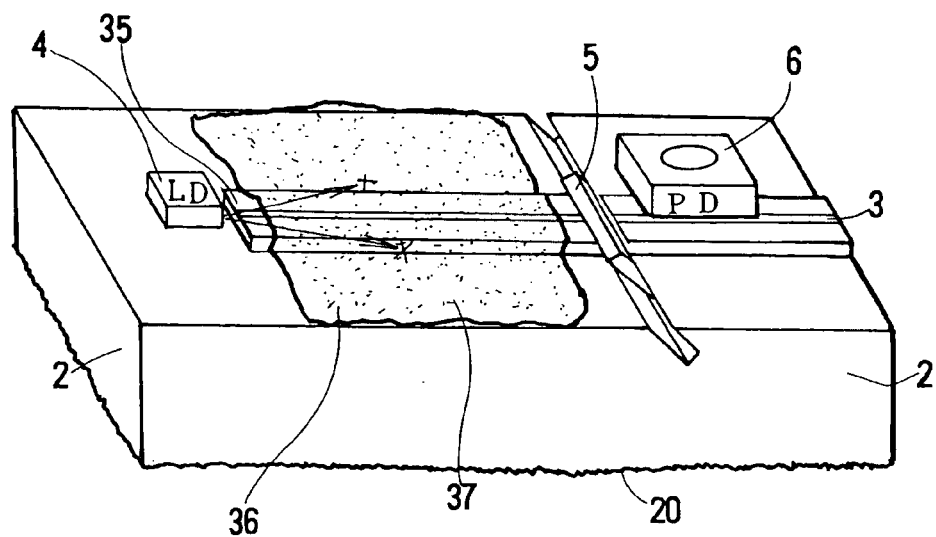
Fig.7  Embodiment 5
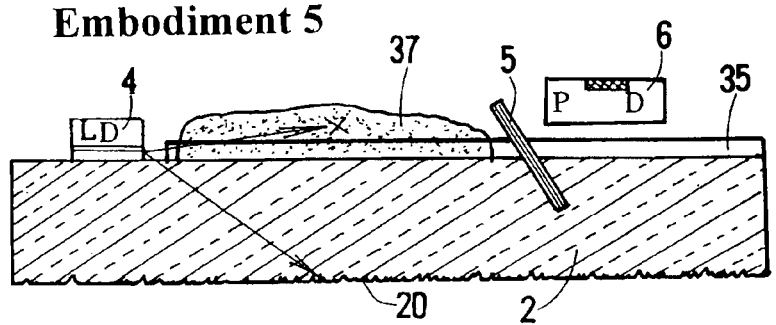

Fig.8  Embodiment 5
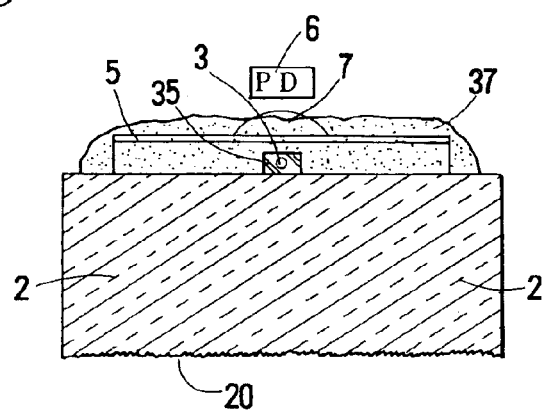
Fig.9  Embodiment 6
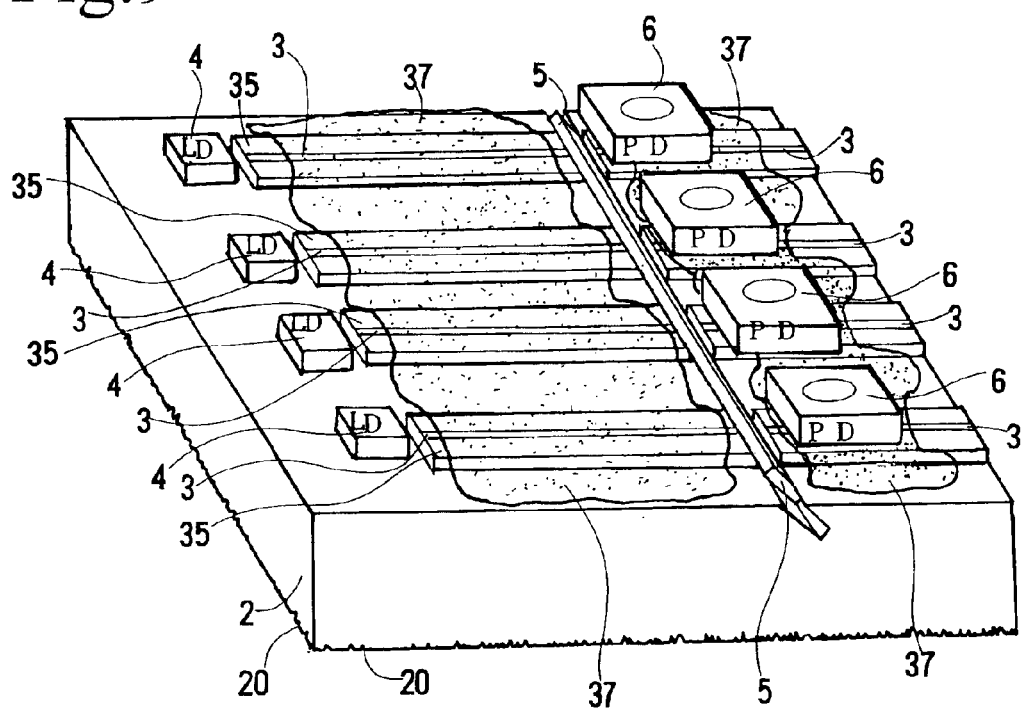

Fig.10  Embodiment 6
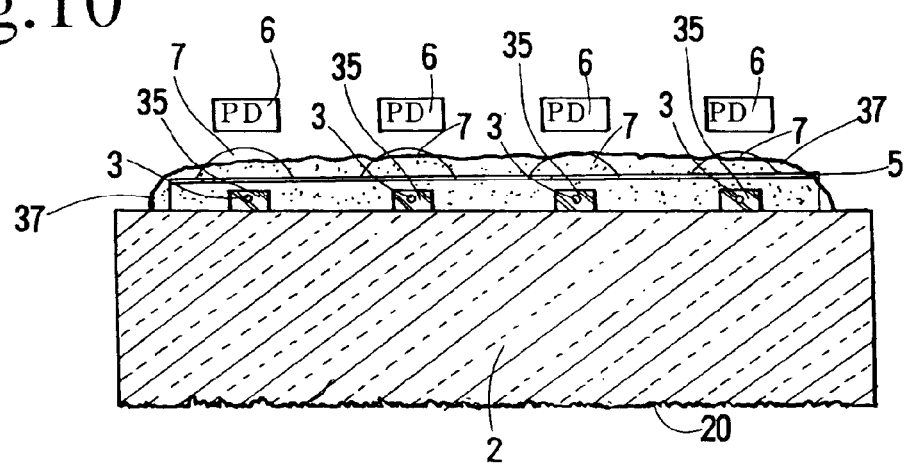
Fig.11  Embodiment 6
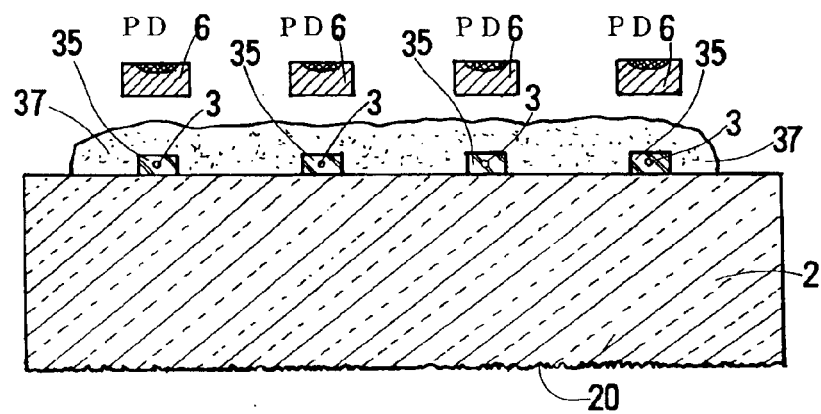

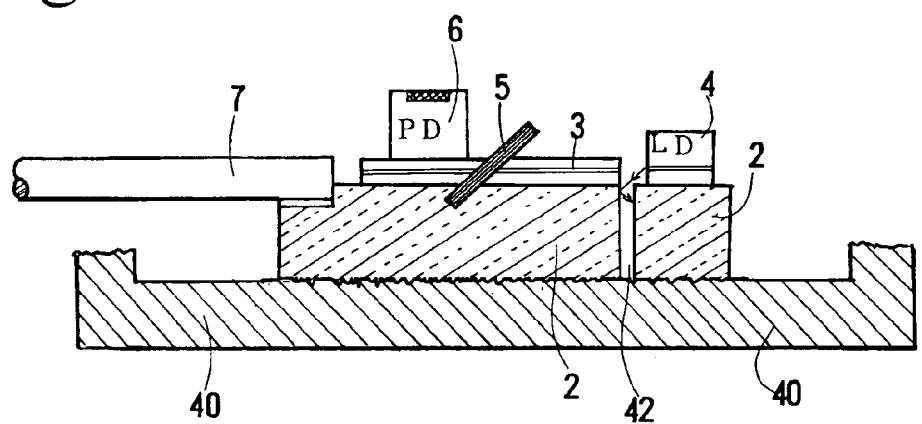
Fig.12  Embodiment 7

OPTICAL COMMUNICATION MODULE

BACK GROUND OF THE INVENTION

1. Field of the Invention

This invention relates to a planar type optical communication module suppressing optical crosstalk between a signal transmitting part (laser diode part: LD) and a signal receiving part (photodiode part: PD). Optical communication (LD/PD) modules which have been actually utilized in optical communications have an individual transmitting (LD) part encapsulated in a metallic package, an independent signal receiving (PD) part sealed in another metallic package and a Y-branch coupler for joining the independent LD part and the separated PD part. In the conventional modules, LD light does not leak from the metallic package. A metallic case protects the PD part from outer noise light. The metallic packages doubly suppress optical crosstalk between the transmitting part and the receiving part. Conventional metallic case modules exhibit high performance for annihilating the optical crosstalk.

This application claims the priority of Japanese Patent Application No.2002-125534 filed on Apr. 26, 2002, which is incorporated herein by reference.

A conventional transmitting (LD) part has an expensive cylindrical metallic stem with a pole, a laser diode mounted on a side of the stem pole, a monitoring photodiode laid upon a stem at a center, a converging lens, a lens holder welded on the stem for sustaining the lens, a ferrule holder fitted on the lens holder for retaining a ferrule at an end of a fiber and a bend-limiter on the ferrule holder for preventing excess curvature of a fiber end.

A conventional signal receiving (PD) part has an expensive cylindrical metallic stem, a top incidence type photodiode laid upon a stem at a center, a converging lens, a lens holder fixed to the stem for keeping the lens, a ferrule holder fitted upon the lens holder for maintaining a ferrule, a bend limiter fitted on the lens holder for prohibiting excess bending of a fiber end. An independent Y-branch coupler unifies an LD fiber from the transmitting part and a PD fiber from the receiving part into a fiber which communicates with a central station or so. The Y-branch coupler contains, for example a WDM (wavelength division multiplexer) for dividing a PD beam and an LD beam by a difference of wavelengths.

One of the fiber tails of the Y-coupler is joined to the metallic case of the transmitting (LD) part. The other of the tails is connected to the metallic case of the receiving (PD) part. The module has a metal-cased separated LD part and an independent metal-cased PD part. The WDM discriminates LD beams and PD beams by the wavelength difference in the isolated Y-branch coupler.

In some cases, dielectric multilayered filters may be inserted into the branched fibers for suppressing fiber-carrying optical crosstalk further. There is no possibility of strong LD beams invading into the PD part in expensive, sophisticated conventional modules.

Light beams propagate in free space in three dimensional devices. Lenses are indispensable in the modules for converging beams. Conventional metal-encapsulated devices are large sized, high-cost modules with many costly parts distributing in three dimension space. The high cost and large size inhibit optical communications from pervading the world. Low-cost, small sized and integrated modules operative at a high frequency are required for further prevalence of optical communications.

2. Description of Related Art

Surface Mountable Type (PLC type) modules, which make y-branch lightwaveguides on a silicon bench, placing a WDM filter on the lightwaveguides, laying a photodiode and a laser diode at separated ends of the branched lightwaveguides on the silicon bench, are promising for cost-reduction, integration and miniaturization of optical communications modules. Use of the Y-branched lightwaveguides enables the module to reduce optical crosstalk by separating the photodiodes far from the laser diodes. Horizontally extending Y-branch lightwaveguides, which require a wide horizontal space on the silicon bench, are not suitable for miniaturization of modules.

Another type of surface mountable modules without y-branch has been proposed. It is a linear lightpath type LD/PD module which makes a straight lightpath (lightwaveguide or fiber) on a silicon bench, lays a photodiode halfway above a lightpath, positions a laser diodes at rear end of the lightpath on the bench and furnishes a wavelength selective filter behind the photodiode midway on the lightpath for reflecting receiving signal beams slantingly upward to the photodiode. The receiving beam is separated not in the horizontal direction but in the slantingly upward direction by the slanting wavelength selective filter which is vertical to the lightpath in the horizontal plane. Non-horizontal separation enables the linear module to save the space occupied by lightpaths on the bench.

The linear lightpath module, which has a linear lightwaveguide or a linear fiber on the silicon bench, has a problem of the optical crosstalk between the laser diode and the photodiode. When strong beams emitted from the laser diode arrive at a highly sensitive photodiode by random scattering or reflection, laser stray beams induce noise in the photodiode, which causes malfunction of a signal receiving part. The signal receiving part should be separated and shielded from a signal transmitting part by some means. However, it is difficult to shield the receiving part (photodiode) from the transmitting part (laser diodes) optically, because the receiving part is enclosed with the transmitting part in the same one package in the surface mountable (PLC; planar lightguide circuit) type module.

$\lambda_1$ is a wavelength of the transmitting light of a laser diode. $\lambda_2$ is a wavelength of the receiving light for a photodiode. The term "crosstalk" means two kinds of interference between the transmitting part and the signal receiving part. One is electrical crosstalk. Electric currents generated in the transmitting (LD) part make noise in a photocurrent of the photodiode. The other is optical crosstalk. $\lambda_1$ emitted from the laser diode propagates to the photodiode and makes noise in the photocurrent. If the photodiode is sensitive to $\lambda_1$ and the bench is transparent for $\lambda_1$, the optical crosstalk becomes a problem. The silicon bench is transparent for $\lambda_1$. Some plastic benches are transparent for $\lambda_1$. If the bench is electrically conductive, the electric crosstalk is another problem. A silicon bench is conductive.

For example, in an ONE (subscriber site) module, a laser diode (LD) emits 1.3 $\mu$m light ($\lambda_1$), which is transmitted via an optical fiber to a central station. At the central station, a laser diode in a station module emits 1.55 $\mu$m light ($\lambda_2$), which is transmitted via the same optical fiber to the ONE module and is detected by the photodiode at the ONE. $\lambda_1$ is upward light. $\lambda_2$ is downward light. The present invention aims at an improvement of ONE modules. Thus $\lambda_2$ is named as receiving light and $\lambda_1$ is named as transmitting light from the standpoint of the ONEs (subscribers). An ONU photodiode has an InGaAs light receiving layer which has sensitivity also to 1.3 µm light ($\lambda_1$). When $\lambda_1$ goes into the ONU photodiode, the photodiode senses $\lambda_1$, which causes the optical crosstalk.

Single-fiber bidirectional simultaneous communications, which send signals via a single fiber in binary directions from the station to the ONE and from the ONE to the station at the same time, are liable to cause LD $\lambda_1$ light to leak and invade into the photodiode furnished in the same package. The light beam is called a stray (light) beam. There are many possible leaking paths from the laser diode to the photodiode at the ONU. A beam upward emitted from the front of the laser diode slantingly makes its way and directly shoots a front of the photodiode. Another beam emitted via a rear end from the laser diode is reflected by a rear wall and a top wall of a metallic package and go slantingly via a top into the photodiode. Another beam which has once gone into a lightpath leaks out upward and arrives at the front of the photodiode. Another lightwaveguide/fiber propagating beam is reflected at the end of the lightwaveguide or the fiber and is turned to the photodiode. Another beam which is reflected by a WDM mirror is again reflected at the bottom of the bench and attains to the photodiode.

There are a variety of origins of making stray beams emitted from the laser diode and invading the photodiode in a unified ONU module. Surface mountable type (PLC; planar lightguide circuit type) ONU modules have a drawback of high possibility of inducing various LD stray beams to reach the photodiode, which causes serious optical crosstalk. Faster the bit rate of signals is, the stronger the requirement of low crosstalk becomes. Some ones proposed contrivances for suppressing the optical crosstalk in surface mountable type modules at an ONU.

① Japanese Patent Laying Open No.11-248978, "Bidirectional Optical Semiconductor Device".

① challenged to reduce optical crosstalk by painting a top of a photodiode with an opaque (black) resin, enclosing a gap between the photodiode and an optical fiber with an opaque resin and making a high-reflective layer on the bottom of a silicon bench. ① tried to prevent crosstalk by three contrivances.

A backward-emitted LD beam which would be doubly reflected by a back and a top of a metallic case and would shoot a photodiode via a top is recoiled by the black resin covering the top of the photodiode. A forward-emitted LD beam which goes into a fiber on the silicon bench, is reflected by a WDM downward, would be reflected by a bottom of the silicon bench and would be annihilated by being reflected at the bottom high-reflective layer and deviating from the photodiode. Another beam emanating slantingly upward from the fiber is prevented by the opaque resin enclosing the gap.

The known reference ①, however, was not aware of more serious leaking paths of stray LD beams. All possible leaking paths should be clarified. All the possible leaking paths should be choked by some means for annihilating all the stray LD beams. Suppression of optical crosstalk requires to obstruct all the possible leak paths.

FIG. 1 shows a section of a typical surface mountable LD/PD module built upon a rectangular silicon bench 2. A linear lightwaveguide 3 is produced upon the silicon bench 2. The lightwaveguide 3 is a core 8 of a higher refractive index enclosed by a cladding layer 9 which is also called a lightwaveguide layer. A laser diode (LD) 4 is mounted at a rear end of the silicon bench 2 at the back of a rear end of the lightwaveguide 3 (8). Forward LD light is injected into the end of the lightwaveguide 3. A slanting wavelength selective filter 5 is inserted into a slanting groove formed midway on the lightwaveguide 3 on the bench 2. A bottom incidence type photodiode (PD) 6 is mounted by a submount (omitted) above the lightwaveguide 3 slantingly upward from the wavelength selective filter 5. The submount is omitted not for obscuring probable stray beams. The wavelength selective filter 5 reflects $\lambda_2$ light running in a fiber 7 and the lightwaveguide 3 slantingly upward to the photodiode 6 and admits $\lambda_1$ LD forward light to pass toward the fiber 7.

An optical fiber 7 is adhered to a front end of the lightwaveguide 3. The lightwaveguide 3 means a narrow core 8 with the higher refractive index enclosed by a planar cladding 9 (lightwaveguide layer) with a lower refractive index.

Transmitting light emitted from the laser diode (LD) is named as $\lambda_1$ light. Receiving signal light which should be sensed by the photodiode is named as $\lambda_2$ light. The photodiode has sensitivity to $\lambda_1$ as well as to $\lambda_2$, which causes optical crosstalk between the LD and the PD.

A beam BC emitted from the laser diodes (LD) 4 slantingly downward shoots at a bottom C of the substrate 2. The flat bottom reflects the beam BC upward to the photodiodes 6. The beam BCD is a first possible stray beam which induces optical crosstalk.

Another beam BE slantingly downward emanating from the laser diode (LD) 4 is reflected at a bottom point E and at a front spot F of the bench 2. A reflected beam FG goes into the photodiode 6. The doubly-reflected beam BEFG is a second possible stray beam causing optical crosstalk.

A beam once injected into the lightwaveguide 3 is reflected by the slanting WDM filter 5 at H to a bottom point I. The bottom point I reflects the beam (IJ) toward the photodiode 6. The beam BHIJ is a third possible stray beam of inducing optical crosstalk.

Three possible stray beams BCD, BEFG and BHIJ are all reflected by the bottom of the transparent silicon bench and are led into the photodiode.

The present invention proposes an optical communication module which roughens a bottom of a transparent silicon bench. The roughened bottom induces random scattering of laser leaking beams. The random scattering of laser beams at the rugged bottom alleviates reflection of the laser beams from the bottom up to a photodiode. The rugged bottom decreases the possibility of laser-emitted stray beams arriving at the photodiode.

In addition to roughening the bottom, the present invention proposes to paint the bottom of the Si bench with a photoabsorbent (black) resin, pigment or paint for further reducing the reflection of laser stray beams at the bottom. Otherwise, the roughened bottom is glued to an insulating package with an photoabsorbent adhesive. The "photoabsorbent" means a function of absorbing light at a wavelength of the laser light. Laser beams are not visible light. Black resins, pigments or paints, however, are suitable for covering the rugged bottom as a photoabsorbent one. Absorption of light by the photoabsorbent material further alleviates optical crosstalk by reducing the reflection of the laser stray beams at the bottom of the transparent silicon bench.

A third improvement of the present invention is to narrow a cladding of a lightwaveguide and to cover the narrowed cladding with a photoabsorbent resin, pigment or paint. The photoabsorbent resin chokes optical paths of laser beams propagating via the cladding into the photodiode.

A fourth contrivance of the present invention is to give a deep notch on the electric conductive silicon bench between the lightpath and the laser diode for reducing optical and electrical crosstalk.

SUMMARY OF THE INVENTION

The present invention succeeds in reducing optical crosstalk by suppressing reflection of laser stray beams at a bottom of a silicon bench by roughening the bottom. Roughness induces random scattering of stray laser beams at the bottom and inhibits stray beams from attaining a photodiode.

Painting a photoabsorbent resin, pigment or adhesive on the roughened bottom enhances the reduction of crosstalk by absorbing the laser stray beams at the bottom of the silicon bench.

The present invention further decreases optical crosstalk by narrowing the width of a cladding, painting the cladding with a black resin, paint or adhesive which absorbs sideways stray beams which do not go into a core, propagate in the cladding and reach the photodiode.

Optical and electrical crosstalk is still further reduced by gluing the silicon bench to an insulating plate, cutting the silicon bench to the insulating plate at a point between a lightpath and a laser diode, and separating the silicon bench from the laser diode.

BRIEF DESCRIPTION OF THE DRAWINGS

FIG. 1 is an explanatory sectional view of a typical bidirectional simultaneous surface mountable LD/PD (transceiver) module having a silicon bench, a laser diode behind a rear end of a lightwaveguide, a photodiode at a front part and a wavelength selective filter at an intermediate part of the lightwaveguide on the silicon bench for clarifying a variety of stray beams which start from the laser diode and shoot the photodiode at the end. Hatching is omitted not for obscuring the stray beams.

FIG. 2 is a sectional view of Embodiment 1 of a linear lightwaveguide type LD/PD module having a roughened bottom for reducing optical crosstalk by randomly scattering stray beams at the roughened bottom.

FIG. 3 is a sectional view of Embodiment 2 of a linear lightwaveguide LD/PD type module having a roughened bottom adhering to a roughened package with a photoabsorbent (opaque) resin for reducing optical crosstalk by randomly scattering stray beams at the roughened bottom and absorbing stray beams in the photoabsorbent resin.

FIG. 4 is a perspective view of Embodiment 3 of a y-branch lightwaveguide type LD/PD (transceiver) module having a roughened bottom for reducing optical crosstalk by randomly scattering stray beams at the roughened bottom.

FIG. 5 is a rear view of Embodiment 4 of a parallel multichannel lightwaveguide type LD/PD (transceiver) module having a roughened bottom for reducing optical crosstalk by randomly scattering stray beams at the roughened bottom.

FIG. 6 is a perspective view of Embodiment 5 of a linear lightwaveguide LD/PD type module having a roughened bottom, a narrowed cladding and a photoabsorbent resin, adhesive, paint or pigment painted on the narrowed cladding for reducing optical crosstalk by randomly scattering stray beams at the roughened bottom and absorbing stray beams running in the photoabsorbent resin, adhesive, paint or pigment over the cladding.

FIG. 7 is a sectioned side view, which is sectioned along an axial line, of Embodiment 5 of the linear lightwaveguide LD/PD type module having the roughened bottom, the narrowed cladding and the photoabsorbent resin, adhesive, paint or pigment painted on the narrowed cladding for reducing the optical crosstalk by the randomly scattering stray beams at the roughened bottom and absorbing the stray beams running in the photoabsorbent resin, adhesive, paint or pigment over the cladding.

FIG. 8 is a sectioned rear view, which is sectioned along a lateral line vertical to the axial line, of Embodiment 5 of the linear lightwaveguide LD/PD type module having the roughened bottom, the narrowed cladding and the photoabsorbent resin, adhesive, paint or pigment painted on the narrowed cladding for reducing the optical crosstalk by the randomly scattering stray beams at the roughened bottom and absorbingthe the stray beams running in the photoabsorbent resin, adhesive, paint or pigment over the cladding.

FIG. 9 is a perspective view of Embodiment 6 of a parallel multichannel lightwaveguide LD/PD type module having a roughened bottom, narrowed claddings and a photoabsorbent resin, adhesive, paint or pigment painted on the narrowed claddings for reducing optical crosstalk by randomly scattering stray beams at the roughened bottom and absorbing stray beams running in the photoabsorbent resin, adhesive, paint or pigment over the cladding.

FIG. 10 is a sectioned front view, which is sectioned along a lateral line crossing the laser diodes, of Embodiment 6 of the parallel multichannel lightwaveguide LD/PD type module having the roughened bottom, the narrowed claddings and the photoabsorbent resin, adhesive, paint or pigment painted on the narrowed claddings for reducing the optical crosstalk by the randomly scattering stray beams at the roughened bottom and absorbing the stray beams running in the photoabsorbent resin, adhesive, paint or pigment over the cladding.

FIG. 11 is a sectioned rear view, which is sectioned along a lateral line crossing the photodiodes, of Embodiment 6 of the parallel multichannel lightwaveguide LD/PD type module having the roughened bottom, the narrowed claddings and the photoabsorbent resin, adhesive, paint or pigment painted on the narrowed claddings for reducing the optical crosstalk by the randomly scattering stray beams at the roughened bottom and absorbing the stray beams running in the photoabsorbent resin, adhesive, paint or pigment over the cladding.

FIG. 12 is a sectioned side view of Embodiment 7 of a linear lightwaveguide type LD/PD module having a roughened bottom adhering to a roughened insulating package with a photoabsorbent adhesive and a slot cut to the bottom on a silicon bench between a laser diode and a lightwaveguide for reducing optical crosstalk by random scattering at the bottom of the bench and reducing electric crosstalk by the slot on the silicon bench.

DETAILED DESCRIPTION OF THE PREFERRED EMBODIMENTS

[Embodiment 1 (Roughening Bottom of Silicon Bench: FIG. 2)]

Silicon benches are made from a silicon mirror wafer. A bottom of a silicon bench is a flat, smooth mirror surface with a high reflection rate. The present invention roughens the bottom of the silicon bench for reducing reflection at the bottom. Roughness induces random scattering in stead of straightforward reflection. A silicon bench with a roughened bottom is obtained by hurting a bottom of a silicon wafer by a polishing paper of a mesh of 10 μm to 30 μm. Another polishing paper with a mesh larger than 30 μm is also available. Wet etching with an etchant roughens a silicon wafer otherwise.

FIG. 2 shows Embodiment 1 of an optical communication module built upon a silicon bench having a roughened bottom. The silicon bench 2 has a bottom 20 of a rugged surface. A lightwaveguide 3 is produced upon a top of the silicon bench 2 in a longitudinal direction. A laser diode 4 is installed behind a final end of the lightwaveguide 3 on a rear portion of the silicon bench 2. A slanting wavelength selective filter 5, which obliquely intersects the lightwaveguide 3, is laid midway upon the silicon bench 2. A photodiode 6 is installed slantingly in front of the wavelength selective filter 5 above the lightwaveguide 3 via a submount (not shown in the figures). The wavelength selective filter 5 reflects $\lambda_2$ beams propagating in the lightwaveguide upward to the photodiode 6 and allows $\lambda_1$ beams emitted from the laser diode 4 to pass therethrough. The submount which lifts the photodiode is omitted in the figures for clarifying stray laser beams.

An end of an optical fiber 7 is glued at a staring end of the lightwaveguide 3 on the silicon bench 2. The optical fiber 7, which connects an ONU (subscriber) to a central station, allows light signals to propagate in two directions. The optical fiber 7 transmits $\lambda_1$ laser beams from the subscriber to the central station and sends $\lambda_2$ beams emitted from a station laser to the lightwaveguide 3, which guides the $\lambda_2$ to the photodiode 6.

Ruggedness prevents the bottom from reflecting the beam BC emitting slantingly downward from the laser diode (LD) in FIG. 2. Most of the beam BC extinguishes at the rugged bottom by random scattering. Random reflection at the roughened bottom prevents reflected beams from attaining the photodiode PD. Another beam BE is not reflected at the roughened bottom of the bench. Another beam BHI which once goes into the lightwaveguide and is reflected by the wavelength selective filter 5 downward and arrives at the bottom is not also reflected by the rugged bottom. The beam vanished at point I due to the random scattering.

[Embodiment 2 (Roughened Bottom, Photoabsorbent Resin: FIG. 3)]

FIG. 3 shows a sectional view of another embodiment which paints a photoabsorbent adhesive, for example epoxy adhesive doped with a photoabsorbent filler, on the roughened bottom and glues a silicon bench to an insulating package at the bottom with the photoabsorbent adhesive. Embodiment 2 has the fundamental structure having a lightwaveguide formed on the bench 2, a laser diode placed behind an end of the lightwaveguide on the bench, a wavelength selective filter fixed slantingly halfway on the lightwaveguide, a photodiode installed slantingly forward above the wavelength selective filter and a roughened bottom of the bench, which is similar to Embodiment 1.

An additional improvement is to paint a photoabsorbent (e.g., black) adhesive 23 on the rugged bottom 20 of the silicon bench. The bottom is adhered to a rugged surface of an insulating package 24 with the photoabsorbent adhesive. The adhesive plays two roles of adhering the bench to the package and of absorbing LD stray rays at the bottom. Since the stray rays from the laser diode are absorbed by the adhesive, random reflection on the bottom is reduced. When the silicon bench is transfer-moulded with another resin into a plastic package, photoabsorbent resin, pigment or paint is available in stead of the adhesive.

[Embodiment 3 (Roughened Bottom, Y-branch: FIG. 4)]

Roughening of a bottom is also effective to y-branched lightpath modules for decreasing crosstalk. A Y-branched LD/PD module was proposed, for example by ②Japanese Patent Laying Open NO. 11-68705, "Two-Way WDM Optical Transmission Reception Module".

FIG. 4 shows Embodiment 3 which is an example of applying the present invention to a Y-branch module. The module has y-branched lightwaveguides 32, 33 and 34 upon a silicon bench 2. An optical fiber 7 is joined to a starting front of the lightwaveguide 32. At a y-branch, a wavelength selective filter 5 is upright erected in a groove extending in a lateral direction on the silicon bench. The wavelength selective filter 5 reflects $\lambda_2$ beams and admits $\lambda_1$ beams to pass. A final end of the lightwaveguide 33 faces a laser diode 4 which oscillates $\lambda_1$ transmitting signal light. An end of the lightwaveguide 34 faces a photodiode 6 for receiving signals sent from a central station. Transmitting $\lambda_1$ beams emitted from the laser propagate in the lightwaveguides 33, a filter 5, the lightwaveguide 32 and the optical fiber 7. Receiving $\lambda_2$ beams propagating in the optical fiber 7 goes into the lightwaveguide 32, is reflected by the filter 5 to the lightwaveguide 34 and is guided to the photodiode 6.

In the case of the y-branch lightpath module, some of the downward beams emitted from the laser diode 4 are reflected by a bottom of the silicon bench. The bottom should be roughened by the teaching of the present invention for inhibiting the bottom from reflecting the laser beams upward toward the photodiode. The rugged bottom has an effect similar to Embodiment 1 of the linear lightpath module, as shown in FIG. 2. Unlike FIG. 2, the module has an erect wavelength selective filter which does not reflect horizontal laser beams toward the bottom. There is no possibility of a beam BHIJ in FIG. 1. The rugged bottom is still significant for suppressing a stray beam BCD in FIG. 1 by random scattering at C on the bottom 20.

[Embodiment 4 (Multichannel Module, Roughened Bottom: FIG. 5)]

Bottom roughening can be applied also to multichannel modules having a plurality of lightpaths which are equal to the channel number for decreasing optical crosstalk. FIG. 5 is a rear view of a bottom-roughened multichannel module as another embodiment. This is an example of a four channel module. The present invention can also be applied to eight channel, sixteen channel and so forth. In FIG. 5, a silicon bench has four parallel sets of a lightpath, laser diode, photodiode and filter. The bench has a rugged bottom for prohibiting the rugged bottom from reflecting stray laser diode beams upward to the photodiode, which reduces crosstalk between paired photodiode and laser diode. The roughened bottom has an additional effect of decreasing crosstalk between photodiodes and neighboring laser diodes in the multichannel ones.

[Embodiment 5 (Narrowing Cladding, Photoabsorbent Resin, Covering, W<U: FIGS. 6 to 8)]

A lightwaveguide layer which consists of a 10 μm thick upper cladding layer and a 10 μm thick lower cladding layer are allover formed on a silicon bench in conventional PLCs. A 6 μm square core of a higher refractive index is formed between the upper and lower claddings. The full thickness of the lightwaveguide layer is 26 μm. A lightwaveguide means the 6 μm square core enclosed with the 10 μm upper and 10 μm lower claddings. Extra portions without the cores have 26 μm thick claddings. In general, the lightwaveguide layer has a uniform flat surface. Embodiment 6 tries to improve the uniform cladding structure for further crosstalk reduction.

FIG. 6 shows Embodiment 5 which narrows cladding of lightwaveguides and covers the cladding with a photoabsorbent (black) resin. The width W of the cladding should be smaller than the width U of the photodiode. Namely W<U.

Former embodiments roughened a bottom for decreasing the reflection of stray laser beams at the bottom. Embodiment 5 aims at reducing other stray beams of which nobody has been aware. There are stray laser beams which deviate sideways from the core of the lightpath, propagate in the cladding and arrive at the photodiode and induce crosstalk. The purpose of Embodiment 5 is to reduce the crosstalk caused by sideways stray beams.

Upward stray beams and downward stray beams (BCD in FIG. 1) have been known. The sideways stray beams are newly found by the inventors of the present invention.

A laser diode has an extremely narrow longitudinal emission stripe of a thickness of 0.1 to 0.2 μm and a width of 1 to 2 μm. Too thin stripe induces a very wide emission aperture of about 30 degrees. A part of the diverging laser beams goes into the cladding of the lightwaveguide as stray beams. The cladding is transparent. The stray laser beams propagate in the cladding without attenuation. A part of the stray beams is scattered, reflected and guided by a wavelength selective filter into the photodiode.

Embodiment 5 suppresses horizontally propagating stray laser beams by narrowing the width W of the cladding down under the width U of the photodiode (W<U). A current photodiode has a width and a length of 300 μm to 500 μm. Embodiment 5 narrows the width of the cladding to a size smaller than 300 μm. A photoabsorbent (black, dark grey or so) resin, adhesive or pigment should be painted on the narrowed claddings and extra space without cladding on the silicon bench. The black resin isolates lightpaths (waveguides or fibers) from other paths. The photoabsorbent resin shields individual photodiodes from stray beams emitted out of neighboring laser diodes.

FIG. 6 is a perspective view of Embodiment 5 which has a narrow cladding covered with the photoabsorbent resin. FIG. 7 is a vertical sectional side view of Embodiment 5. FIG. 8 is another vertical sectional rear view sectioned along a lateral line vertical to the lightpath. The figures show a narrow cladding 35 of a lightwaveguide 3 and an extra vacant space 36 without lightwaveguide 3 on both sides of the cladding 35. The narrowed cladding 35 and the vacant space 36 are covered with a photoabsorbent (black) resin, pigment or adhesive 37. Random dots show the black resin 37. Stray laser beams sideways deviating from the core are absorbed at points (X marks of FIGS. 6 and 7) outside of the cladding by the black resin 37. The absorption of the stray laser beams alleviates noise beams arriving at the photodiode 6.

[Embodiment 6 (Multichannel, Narrow Cladding, Black Resin, W<U: FIGS. 9 to 11)]

Multichannel modules, which contains a plurality of lightpaths, lasers and photodiodes, are troubled with extra interchannel crosstalk from the lasers to neighboring photodiodes in addition to the inherent crosstalk between a laser and a photodiode positioned on the same lightwaveguide. The narrowed cladding coated with a black resin is more effective in the multichannel modules than single channel modules for alleviating crosstalk. FIG. 9 shows a perspective view of an application of the present invention to a multichannel optical communication module. FIG. 10 is a front view sectioned along a lateral line crossing laser diodes. FIG. 11 is a rear view sectioned along a lateral line crossing photodiodes. Four lightwaveguides 3 with narrowed claddings 35 are produced upon a silicon bench 2. A black resin 37 is supplied upon the narrowed claddings 35 and vacant spaces. The narrowed cladding and the black resin inhibit laser beams from propagating in the lightwaveguides and invading into neighboring photodiodes. The black resin coated claddings are advantageous for suppressing interchannel crosstalk.

[Embodiment 7 (Gluing Bench on Insulating Plate, Cutting Bench for Separating Laser from Lightwaveguide: FIG. 12)]

FIG. 12 shows Embodiment 7 which is effective for suppressing both optical and electrical crosstalk. A module has a silicon bench 2 with a roughened bottom, a lightwaveguide 3 formed on the silicon bench 2, a laser diode 4 laid at a back of the lightwaveguide, a photodiode 6 installed halfway on the lightwaveguide, a selective filter 5 inserted in a groove formed across the lightwaveguide and a fiber 7 embedded at a front of the bench 2. The roughened bottom of the silicon bench 2 is stuck on an insulating plate, for example of a liquid polymer(LCP) with an adhesive. The silicon bench 2 is fully cut from the top to the bottom at a point between the lightwaveguide 3 and the laser diode 4. A notch 42, which attains to the insulating plate 40, electrically separates the laser 4 from the extra part of the silicon bench 2. The insulating package maintains unification of a module.

Since refractive indices of the silicon bench 2 and a surrounding resin are different, most of the stray beams (BC beam and BE beam in FIG. 1) in downward emitted from the laser diode 4 are reflected by the notch 42 further downward. A smaller portion of the stray beams comes into the silicon bench and arrives at the bottom. The roughness of the bottom attenuates the stray laser beams further. The notch 42 alleviates optical crosstalk.

Silicon is a conductive material. Since the silicon bench 2 is fully cut between the laser diode 4 and the lightwaveguide 3, strong driving current of the laser diode causes no influence upon an operation of the photodiode in FIG. 12. The deep notch 42 decreases electrical crosstalk between the laser diode and the photodiode in addition to the reduction of optical crosstalk.

A 2 dB noise reduction at a high speed bit rate of 1.25 Gbps is confirmed for the improvement of FIG. 12. The large noise reduction is an effect of decreases of both the optical crosstalk and the electrical crosstalk.

What we claim is:

1. An optical communication module comprising:
   a bench with a top and a roughened bottom coated with a photoabsorbent resin, adhesive, pigment, or paint;
   a lightwaveguide having a core of a higher refractive index and a cladding of a lower refractive index and being formed upon the top of the bench;
   an optical fiber having a front end joined to the lightwaveguide for transmitting signal beams of different wavelengths $\lambda_1$ in $\lambda_2$ both directions;
   a light emitting device mounted on the bench behind a rear end of the lightwaveguide for making a transmitting signal beam of a wavelength $\lambda_1$ for which the bench is transparent;
   a wavelength selective filter mounted on the bench across the lightwaveguide for separating $\lambda_1$ beam and $\lambda_2$ beam; and
   a photodetecting device with sensitivity for both $\lambda_1$ and $\lambda_2$ mounted along the lightwaveguide for receiving $\lambda_2$ beam reflected by the wavelength selective filter.

2. The optical communication module according to claim 1, wherein the cladding of the lightwaveguide has a width W narrower than a width U of the photodiode (W<U) and a narrow cladding is covered with a photoabsorbent resin, adhesive, pigment, or paint.

3. The optical communication module according to claim 1, wherein the roughened bottom of the bench is glued to a roughened surface of a package with a photoabsorbent adhesive.

4. The optical communication module according to claim 1, wherein the bottom of the bench is glued to an insulating plate and the bench is cut from the top to the bottom between the light emitting device and the lightwaveguide.

5. The optical communication module according to claim 1, wherein a plurality of lightwaveguides, light emitting devices and photodiodes are formed on the bench for treating multichannel signals.

6. The optical communication module according to claim 1, wherein a module has a Y-branched lightwaveguide on the top of the bench.

7. The optical communication module according to claim 5, wherein a cladding of the lightwaveguides has a width W narrower than a width U of the photodiode paired with the cladding (W<U) and the narrow claddings are covered with a photoabsorbent resin, adhesive, pigment or paint.

8. The optical communication module according to claim 1, wherein the bottom of the bench is glued to an insulating plate with a photoabsorbent adhesive and the bench is cut from the top to the bottom between the light emitting device and the lightwaveguide.

9. The optical communication module according to claim 1, wherein a plurality of lightwaveguides, light emitting devices and photodiodes are formed on the bench for treating multichannel signals.

10. The optical communication module according to claim 2, wherein the bottom of the bench is glued to an insulating plate with a photoabsorbent adhesive and the bench is cut from the top to the bottom between the light emitting device and the lightwaveguide.

11. The optical communication module according to claim 10, wherein a plurality of lightwaveguides, light emitting devices and photodiodes are formed on the bench for treating multichannel signals.

12. An optical communication module comprising:

a bench with a top and a roughened bottom;

a lightwaveguide having a core of a higher refractive index and a cladding of a lower refractive index and being formed upon the top of the bench;

an optical fiber having a front end joined to the lightwaveguide for transmitting signal beams of different wavelengths $\lambda_1$ and $\lambda_2$ in both directions;

a light emitting device mounted on the bench behind a rear end of the lightwaveguide for making a transmitting signal beam of a wavelength $\lambda_1$ for which the bench is transparent;

a wavelength selective filter mounted on the bench across the lightwaveguide for separating $\lambda_1$ beam and $\lambda_2$ beam; and a photodetecting device with sensitivity for both $\lambda_1$ and $\lambda_2$ mounted along the lightwaveguide for receiving $\lambda_2$ beam reflected by the wavelength selective filter, wherein the bottom of the bench is glued to an insulating plate and the bench is cut from the top to the bottom between the light emitting device and the lightwaveguide.

13. An optical communication module comprising:

a bench with a top and a roughened bottom;

a lightwaveguide having a core of a higher refractive index and a cladding of a lower refractive index and being formed upon the top of the bench;

an optical fiber having a front end joined to the lightwaveguide for transmitting signal beams of different wavelengths $\lambda_1$ and $\lambda_2$ in both directions;

a light emitting device mounted on the bench behind a rear end of the lightwaveguide for making a transmitting signal beam of a wavelength $\lambda_1$ for which the bench is transparent;

a wavelength selective filter mounted on the bench across the lightwaveguide for separating $\lambda_1$ beam and $\lambda_2$ beam; and a photodetecting device with sensitivity for both $\lambda_1$ and $\lambda_2$ mounted along the lightwaveguide for receiving $\lambda_2$ beam reflected by the wavelength selective filter, wherein a plurality of lightwaveguides, light emitting devices and photodiodes are formed on the bench for treating multichannel signals.

14. The optical communication module according to claim 13, wherein a cladding of the lightwaveguides has a width W narrower than a width U of the photodiode paired with the cladding (W<U) and the narrow claddings are covered with a photoabsorbent resin, adhesive, pigment or paint.

* * * * *